Dec. 18, 1951

J. H. PERREAU 2,579,125

SYSTEM FOR THE REPRODUCTION OF MAGNETIC RECORDS

Filed Dec. 21, 1948

INVENTOR.
JULES HENRI PERREAU

BY Robert E. Burns

ATTORNEY

Patented Dec. 18, 1951 2,579,125

UNITED STATES PATENT OFFICE 2,579,125

SYSTEM FOR THE REPRODUCTION OF MAGNETIC RECORDS

Jules Henri Perreau, Paris, France

Application December 21, 1948, Serial No. 66,506
In France December 11, 1947

3 Claims. (Cl. 179—100.2)

Figure 1:
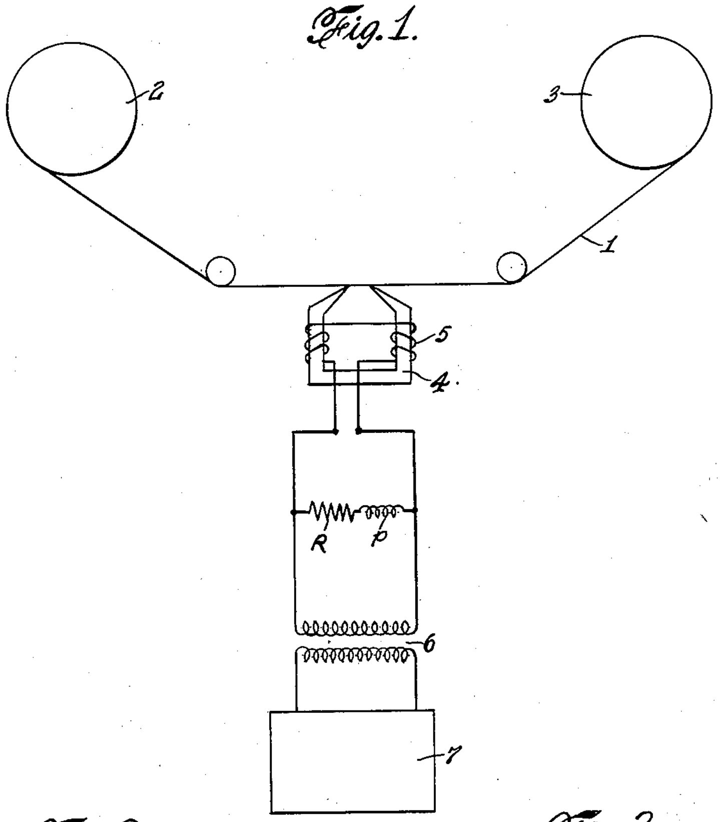

This invention relates to a method and means for the reproduction of magnetic records of sounds.

It is well known that the magnetic recording of sounds consists in rapidly passing a magnetizable band or wire in one direction across the air gap of a magnetic circuit having a winding traversed by a modulated current, the band or wire being capable of retaining a certain residual magnetization after such passage.

If the band or wire thus magnetized is caused to move in the opposite direction across the magnetic circuit, the residual magnetization will in turn induce in the winding of the circuit an electromotive force that will permit the reproduction of the original modulation.

Such a system of recording entails some practical difficulties due to the fact that the magnetic circuits employed, having a high coefficient of self-induction, present an impedance that increases with an increase in the frequency.

It has therefore been found necessary, in order to obtain on the band or wire a constant alternating field whatever the frequency may be, to cause a substantially constant current to flow through the winding of the recording circuit. Consequently, the magnetic recording is performed with a view to obtaining a sufficient inscription of high frequencies at "constant intensity"; and not at "constant tension" as in the other methods of operation.

Upon reproduction from a magnetic band or wire thus impressed, the constant field impressed thereon induces in the winding of the translator head an electromotive force proportional to the frequency, with the result that the resulting voltage constantly increases (in the order of 6 decibels per octave) from low frequencies up to a high frequency of approximately 3,000 cycles where the losses occasioned by the band or wire, or by the circuit itself, become preponderant.

Beyond this frequency the characteristic curve of response bends rapidly. The reproduction of such a band or wire by means of an amplifier reproducing all frequencies would cause heavy loss at low frequency, an exaggerated reproduction of medium frequencies and a considerable drop due to losses at high frequencies.

The above shortcomings of the reproduction have hitherto been remedied by employing correcting or filtering circuits in the amplifier. Such circuits, however, are not easily manageable by reason of the almost unavoidable reaction that occurs between the translator head and the input transformer of the amplifier. This reaction is such that it either permits using only transformers having a low ratio of transformation, rendering difficult the elimination of inner parasitic noises, or restricts to an extremely low value the band of frequencies reproduced.

It is an object of the present invention to provide a method and means, for avoiding the above shortcomings occurring in the reproduction of magnetic records of sounds made at constant intensity. This method in accordance with the invention consists essentially in utilizing the effect of self-induction of the winding of the translator head for correcting the current generated by this head, with the aid of a correcting circuit comprising properly selected electric elements connected to two leads through which said current passes to the amplifier, the translator head winding and the portions of said leads disposed between said elements and the translator head.

Further objects of the present invention will be apparent from the following description and appended claims.

Figure 2:
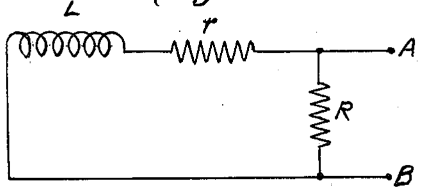
Figure 3:
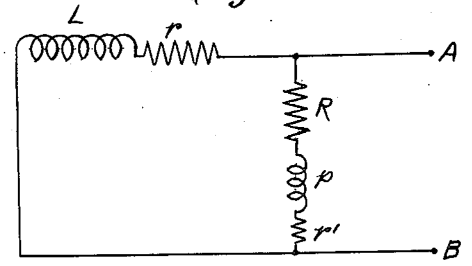
Figure 4:
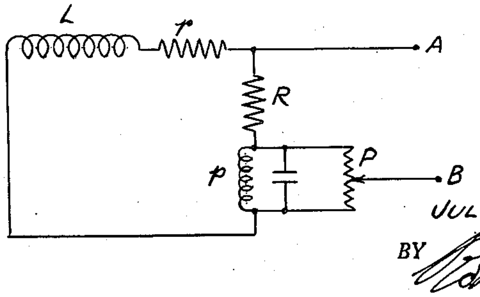

The invention will be described with reference to the accompanying diagrammatic drawings in which:

Fig. 1 shows a form of translating apparatus as hitherto generally employed; and Figs. 2, 3 and 4 show the respective modifications made in the apparatus of Fig. 1 according to and embodying the present invention.

In these drawings common elements are designated by like characters in the various views.

Referring to Fig. 1, it will be seen that the band or wire 1, provided with a magnetic sound-record made thereon at constant intensity, is passed from a reel 2, to a reel 3, through the intermediary of guide rollers across the air gap of a laminated magnet 4 provided with a winding 5 the leads of which are connected to the terminals of the inlet transformer 6 of an amplifier 7 which in turn is electrically connected with suitable loud speakers (not shown).

The magnet 4 and the winding 5 constitutes what is herein called the translator head. The shortcomings of this general arrangement have been set forth hereinabove and, therefore, need not be repeated.

In Figs. 2, 3 and 4, illustrating the respective embodiments of the invention, the winding of the translator head is conveniently represented by its characteristics: self-induction L and its ohmic resistance $r$ assembled as shown, the two leads of the assembly being connected to the terminals A and B, respectively, of the input transformer of the amplifier.

Referring to Fig. 2 which shows a modification made in the arrangement of Fig. 1 according to and embodying the present invention, it will be seen that a selected ohmic resistance R is connected across the two leads through which the currents generated by the translator head pass toward the terminals A and B, so as to form a correcting circuit comprising resistance R, the translator head winding L—r and the portions of said leads ahead of the resistance R, i. e. between the resistance and the translator head.

For the rising portion of the characteristic curve of response (not shown, because well known to those skilled in the art) the following relation may be given:

$$e=K\omega \qquad (1)$$

where $e$ is the electromotive force induced in the winding of the translator head, $\omega$ is the current pulsation and $K$ is a constant depending on the number of turns of the translator head winding and the characteristics of the magnetic circuit used. It will be understood that $\omega=2\pi f$, $f$ being the frequency.

The current $i$ passing in the circuit formed by the translator head and the resistance R will be:

$$i=e/Z=K\omega/[(r+jL\omega)+R] \qquad (2)$$

where Z is the impedance and $jL\omega$ is the value of the self-induction of the translator head winding for a given frequency, and wherefrom may be deduced the voltage between the two points A and B, viz:

$$U=iR=K\omega R/[(r+jL\omega)+R] \qquad (3)$$

Since, in the rising portion of the curve, R and $r$ are insignificant in comparison with $\omega$, the voltage between the points A and B may be expressed as follows:

$$U=K\omega R/L\omega=KR/L \qquad (4)$$

It is clear that this voltage may be considered as independent of the frequency and that a band or wire, provided with a sound record made at constant intensity will be reproduced conveniently, without any special corrections in the corresponding amplifier, at least up to the critical frequency beyond which the electromotive force induced in the translator head ceases to rise.

If, at low frequencies, R and $r$ cannot be neglected, particularly in the case of a translator head with low impedance, the requisite correction will be easily manageable since it will have to make up only a few decibels, whereas in prior arrangements the correction of low frequencies required an increase of 24 decibels.

Beyond the limit frequency where, on account of various losses, the electromotive force of the translator head ceases to rise, it will be advantageous to introduce into the correcting circuit of Fig. 2, between the resistance R and one of the leads, an additional self-induction $l$ with its ohmic resistance $r^1$ as shown in Fig. 3. The impedance of this additional element $l$ will become preponderant starting from the critical point and its effect, insignificant prior to the limit frequency, will be to maintain thereafter a constant voltage between the points A and B.

Prior to the limit frequency the equations hereinabove set forth become:

$$i=K\omega/[(r+jL\omega)+R+(r^1+jl\omega)] \qquad (2)$$

$$U=K\omega[R+(r^1+jl\omega)]/[(r+jL\omega)+R+(r^1+jl\omega)] \qquad (3)$$

As R and $r$ remain insignificant in comparison with L and as $l$ is insignificant in comparison with $R+r^1$, the voltage may be expressed by $$U=K\omega R/L\omega=KR/L \qquad (4)$$

It is clear that the additional self-induction coil $l$ has no effect on the rising portion of the curve.

An examination of the Equation 3 shows that beyond the critical frequency the effect of the additional self-induction element $l$ increases with the numerator, while it remains insignificant in the denominator in comparison with the self-induction of the translator head.

As a result, the correcting action increases with the frequency, maintaining the voltage between the points A and B substantially at a constant value.

The arrangement just described has the following advantages:

(1) Auto-correction of electric losses in the translator head (losses in iron, losses by capacity, losses by resonance of the translator head);

(2) When the translator head thus corrected presents a curve of response which is substantially linear between 30 and 10,000 cycles, a slight correction of high frequencies on the recording or translating amplifiers permits an entirely linear response, between 30 and 15,000 cycles to be easily obtained;

(3) Complete independence of the corrected translator head as regards the input transformer of the amplifier;

(4) The corrected translator head having a low impedance may easily operate a normal transformer having a high ratio of transformation, a fact which permits improving in the order of 20 decibels the working ratio of the amplifier.

A modified form of the correcting circuit of Fig. 3 is shown in Fig. 4 in which it will be seen that in this case the correcting circuit comprises an ohmic resistance R having one end connected with one of the two leads and the other end connected with one end of an assembly comprising an additional self-induction coil $l$, and a potentiometer P connected with the terminals of said self-induction coil, the arrangement being such that the additional self-induction element $l$ is tuned to the highest frequency of the spectrum of frequencies desired to be reproduced (10,000 cycles for example).

By causing the potentiometer P to pick up the voltage employed it is possible to obtain a curve of response varying within ±10 decibels at 10,000 cycles, passing through an absolutely linear curve of response.

The impedance of the corrected translator head is then higher than in the preceding case. The nearest transformer must, therefore, have a lower ratio of transformation and the improvement in the amplifier operation is then somewhat less.

However, by utilizing a translator head with impedance capable of providing a higher level of modulation, the operating ratio of the amplifier will remain favorable.

It will be further possible to feed directly to the grid of the first tube of the amplifier and, consequently, do away with any input transformer, a fact which is of considerable advantage.

What is claimed is:

1. A device for translating magnetic sound records made on metallic films, comprising, in combination, a translator comprising a magnetic core having an air gap, and provided with a winding, means for passing the metallic film in the air gap, an amplifier feeding a receiver, means for connecting the terminals of the translator winding with said amplifier and a correcting circuit connected between the terminals of the said translator, said correcting circuit comprising an ohmic resistance the value of which is small in comparison with the inductance of the translator, and an inductance coil in series with said resistance.

2. A device for translating magnetic sound records made on metallic films, comprising, in combination, a translator comprising a magnetic core having an air gap, and provided with a winding, means for passing the metallic film in the air gap, an amplifier feeding a receiver, means for connecting the terminals of the translator winding with said amplifier and a correcting circuit connected between the terminals of the said translator, said correcting circuit comprising impedance means, and said connecting means comprising a transformer having a primary winding which is connected with the translator and presents an impedance greater than that of the correcting circuit.

3. A device for translating magnetic sound records made on metallic films, comprising, in combination, a translator comprising a magnetic core having an air gap, and provided with a winding, means for passing the metallic film in the air gap, an amplifier feeding a receiver, means for connecting the terminals of the translator winding with said amplifier and a correcting circuit connected between the terminals of the said translator, said correcting circuit comprising an ohmic resistance the value of which is small in comparison with the inductance of the translator, and an inductance coil in series with said resistance, and said connecting means comprising a transformer having a primary winding which is connected with the translator and presents an impedance greater than that of the correcting circuit.

JULES HENRI PERREAU.

REFERENCES CITED

The following references are of record in the file of this patent:

FOREIGN PATENTS

| Number | Country | Date |
|---|---|---|
| 382,600 | Great Britain | Oct. 27, 1932 |
| 584,739 | Germany | Sept. 23, 1933 |